United States Patent
Park et al.

(12)

(10) Patent No.: US 9,063,267 B2
(45) Date of Patent: Jun. 23, 2015

(54) LIQUID CRYSTAL DISPLAY DEVICE

(75) Inventors: Jae Hyun Park, Busan (KR);
Hyeuk-Chan Kwon,
Gyeongsangbuk-Do (KR); Ju-Hun Min,
Gyeongsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 1072 days.

(21) Appl. No.: 12/585,191

(22) Filed: Sep. 8, 2009

(65) Prior Publication Data
US 2010/0165232 A1 Jul. 1, 2010

(30) Foreign Application Priority Data
Dec. 26, 2008 (KR) ................. 10-2008-0135018

(51) Int. Cl.
*G02F 1/1333* (2006.01)
*G02F 1/1335* (2006.01)
*F21V 8/00* (2006.01)

(52) U.S. Cl.
CPC .............. *G02B 6/009* (2013.01); *G02B 6/0051* (2013.01); *G02B 6/0055* (2013.01); *G02F 1/133308* (2013.01); *G02F 1/133615* (2013.01); *G02F 2001/133317* (2013.01)

(58) Field of Classification Search
CPC ............ G02F 1/133615; G02F 1/133605; G02F 1/133512; G02F 1/133553; G02F 1/133608; G02F 1/133308; G02B 6/0031; G02B 6/0055; G02B 6/0088; G02B 6/0083; G02B 6/0046
USPC .................. 349/58, 64, 65, 67, 113, 114, 150
See application file for complete search history.

(56) References Cited

U.S. PATENT DOCUMENTS

| | | | | |
|---|---|---|---|---|
| 5,392,199 A | * | 2/1995 | Kashima et al. | 362/606 |
| 5,688,035 A | * | 11/1997 | Kashima et al. | 362/609 |
| 5,838,406 A | * | 11/1998 | McGregor et al. | 349/113 |
| 6,053,619 A | * | 4/2000 | Nakamura et al. | 362/609 |
| 6,065,845 A | * | 5/2000 | Miyazaki | 362/26 |
| 6,742,907 B2 | * | 6/2004 | Funamoto et al. | 362/625 |
| 7,157,125 B2 | * | 1/2007 | Kamiya et al. | 428/1.5 |
| 7,212,257 B2 | * | 5/2007 | Katsu et al. | 349/65 |
| 7,581,869 B2 | * | 9/2009 | Yoon et al. | 362/630 |
| 2007/0132918 A1 | * | 6/2007 | Pan et al. | 349/96 |
| 2007/0247563 A1 | * | 10/2007 | Mai et al. | 349/64 |
| 2008/0259246 A1 | * | 10/2008 | Watanabe et al. | 349/64 |
| 2008/0278661 A1 | * | 11/2008 | Oh | 349/65 |

FOREIGN PATENT DOCUMENTS

| | | |
|---|---|---|
| CN | 1742179 A | 3/2006 |
| JP | 2005-135860 | 5/2005 |
| JP | 2008-147091 | 6/2008 |
| KR | 10-2006-0056160 A | 5/2006 |

* cited by examiner

*Primary Examiner* — Edward Glick
*Assistant Examiner* — David Chung
(74) *Attorney, Agent, or Firm* — Mckenna Long & Aldridge LLP

(57) ABSTRACT

A liquid crystal display (LCD) device includes: an LC panel; a lamp disposed below the LC panel, for supplying light to the LC panel; a lamp housing having an opening, for encompassing and protecting the lamp; first and second diffusion reflection sheets disposed on end portions of inner lower and upper surfaces of the lamp housing, respectively; and a light guide plate disposed to be adjacent to the opening of the lamp housing, for guiding light emitted from the lamp to the LC panel.

16 Claims, 4 Drawing Sheets

LIQUID CRYSTAL DISPLAY DEVICE

The present disclosure relates to subject matter contained in priority Korean Application No. 10-2008-0135018, filed on Dec. 26, 2008, which is herein expressly incorporated by reference in its entirety.

BACKGROUND OF THE INVENTION

1. Field of the Invention

The present invention relates to a liquid crystal display (LCD) device, and particularly, to an LCD device capable of minimizing the number of optical sheets provided to enhance optical uniformity by implementing uniform brightness of light supplied to an LC panel, and capable of requiring no light shielding unit, the light shielding unit disposed on a region near an optical source so as to be printed on the optical sheet, or additionally provided for prevention of non-uniform brightness.

2. Background of the Invention

In general, a liquid crystal display (LCD) device is being widely used due to advantages such as a light weight, a thin thickness, and low power consumption. Accordingly, the LCD device is being widely used to display images on screens of a portable computer such as a notebook PC, an office automation equipment, an audio/video apparatus, etc.

The LCD device displays desired images on a screen by controlling optical transmittance according to image signals applied to a plurality of controlling switching devices arranged in a matrix format.

The LCD device comprises an LC panel and a driving portion. The LC panel includes an upper substrate, a color filter substrate facing a lower substrate, a thin film transistor (TFT) array substrate, and an LC layer sandwiched by the upper and lower substrates. The driving portion drives the LC panel by supplying scan signals and image information to the LC panel.

Since the LCD device does not spontaneously emit light, it is provided with a light source to supply light to the LC panel so as to implement an image. Accordingly, the LCD device is provided with a backlight assembly including a light source to supply light to the LC panel.

Hereinafter, the conventional LCD device will be explained in more detail with reference to the attached drawings.

As shown in FIG. 1, the conventional LCD device comprises an LC panel 1, a lamp 2 disposed at one side below the LC panel 1, for supplying light to the LC panel 1; a lamp housing 7 configured to encompass and protect the lamp 2, and having an opening; a light guide plate 3 disposed at one side of the lamp 2, for guiding light emitted from the lamp 2 to the LC panel 1; a plurality of optical sheets 5 disposed on the light guide plate 3, for converting light emitted from the light guide plate 3 and supplying it to the LC panel 1; a light shielding unit 13 disposed or printed on an uppermost optical sheet among the plurality of optical sheets; and a reflection sheet 6 disposed under the light guide plate 3, for reflecting light that has leaked to a lower side of the light guide plate 3 into the light guide plate 3.

In the conventional LCD device, light emitted from the lamp 2 is preferably made to be incident on an inner side of the light guide plate 3, and then to be totally-reflected a plurality of times. However, some of light is reflected to the lamp housing 7 or the reflection sheet 6 only one or two times, and then is emitted to outside of the light guide plate 3. The emitted light is observed as bright lines as shown in regions 'A' and 'B' of FIG. 2.

Furthermore, the conventional LCD device may be provided with light emitting diodes rather than the lamp, as an optical source. In this case, some of light emitted from the light emitting diodes is reflected one or two times, onto a printed circuit board or a reflection sheet on which the light emitting diodes are mounted. Then, the reflected light is emitted to outside of the light guide plate, which is observed as bright points as shown in a region of 'C' of FIG. 3.

SUMMARY OF THE INVENTION

Accordingly, the present invention is directed to a liquid crystal display that substantially obviates one or more of the problems due to limitations and disadvantages of the related art.

An advantage of the present invention is to provide a liquid crystal display (LCD) device capable of supplying light to an LC panel with an enhanced optical uniformity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display (LCD) device, comprising: an LC panel; a lamp disposed below the LC panel, for supplying light to the LC panel; a lamp housing having an opening, for encompassing and protecting the lamp; first and second diffusion reflection sheets disposed on end portions of inner lower and upper surfaces of the lamp housing, respectively; and a light guide plate disposed to be adjacent to the opening of the lamp housing, for guiding light emitted from the lamp to the LC panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a liquid crystal display (LCD) device according to the present invention will be explained in more detail.

First Embodiment

An LCD device according to a first embodiment of the present invention will be explained in more detail with reference to FIGS. 4 and 5.

Figure 1:
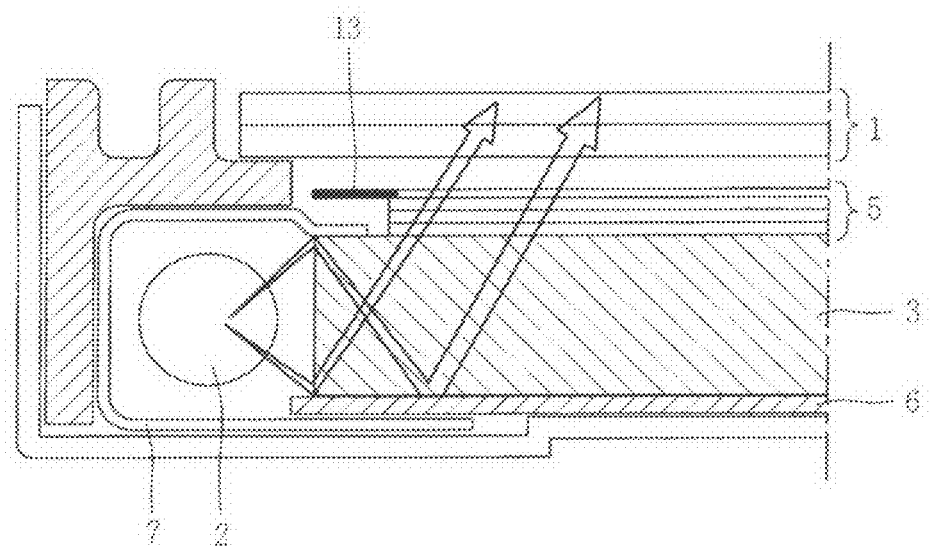
FIG. 1 is a sectional view showing an LCD device in accordance with the conventional art.
Figure 2:
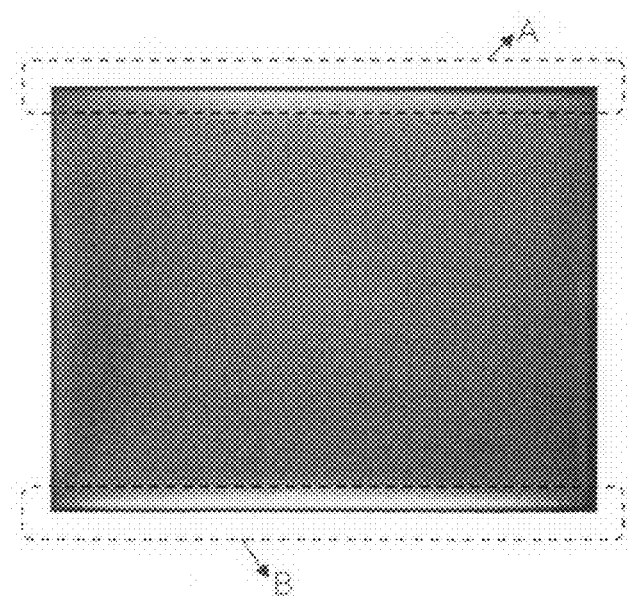
FIG. 2 is a photo showing a lamp driven after sequentially arranging a reflection sheet, a light guide plate, and an optical sheet at one side of the lamp.
Figure 3:
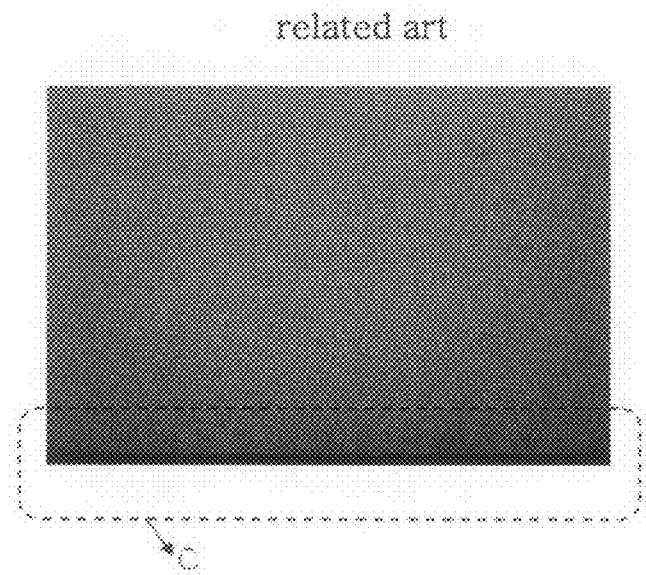
FIG. 3 is a photo showing a light emitting diode driven after sequentially arranging a reflection sheet, a light guide plate, and an optical sheet at one side of the light emitting diode, in an LCD device having the light emitting diode as an optical source.
Figure 4:
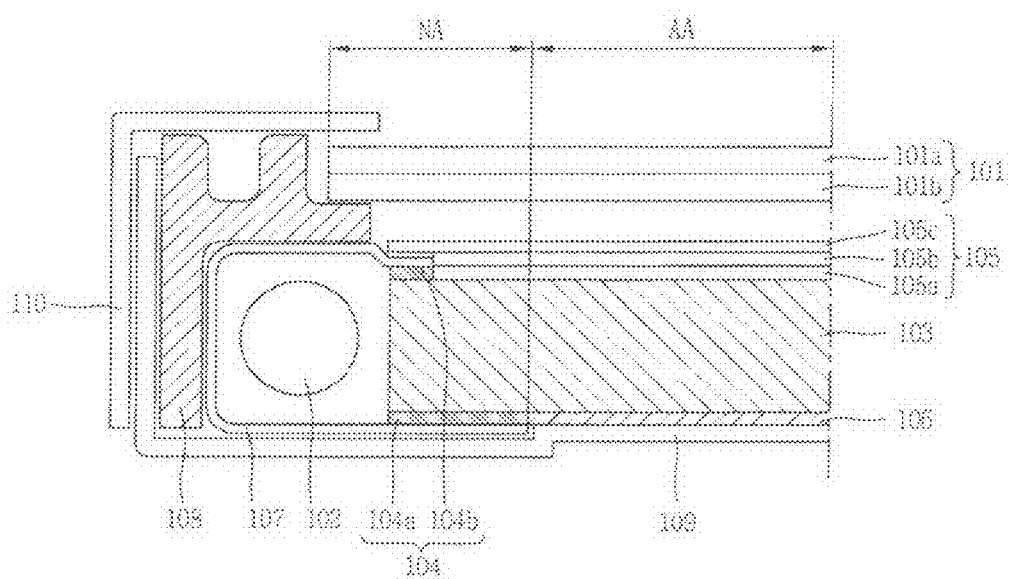
FIG. 4 is a sectional view showing an LCD device according to a first embodiment of the present invention.

As shown in FIG. 4, the LCD device according to a first embodiment of the present invention comprises an LC panel 101; one or more lamps 102 disposed below the LC panel 101, for supplying light to the LC panel 101; a lamp housing 107 having an opening, for encompassing and protecting the lamps 102; first and second diffusion reflection sheets 104a and 104b disposed on end portions of inner lower and upper surfaces of the lamp housing 107, respectively; and a light guide plate 103 disposed to be adjacent to the opening of the lamp housing 107, for guiding light emitted from the lamp 102 to the LC panel 101.

Each component of the LCD device will be explained in more detail.

Referring to FIG. 4, the LC panel 101 is composed of a color filter substrate 101a that is an upper substrate, and a thin film transistor (TFT) array substrate 101b that is a lower substrate.

An LC layer (not shown) is formed between the two substrates 101 and 101b. Although not shown, the LC panel 101 has a display region for displaying an image, and a non-display region disposed at the periphery of the display region.

A plurality of lamps 102 are disposed below the LC panel 101, and the LC panel 101 displays an image by receiving light from the lamps 102.

As the lamps 102, may be used external electrode fluorescent lamps (EEFL) or cold cathode fluorescent lamps (CCFL).

Referring to FIG. 4, the LCD device comprises the lamp housing 107 for encompassing and protecting the lamps 102. The lamp housing 107 is provided with an opening through which light emitted from the lamps 102 is incident onto the light guide plate 103.

A diffusion reflection sheet 104 is disposed on end portions of inner upper and lower surfaces of the lamp housing 107. The diffusion reflection sheet 104 has air distributed therein at random.

The diffusion reflection sheet 104 is different from a general reflection sheet having an air layer inserted thereto through an elongation process. And, the diffusion reflection sheet 104 is formed to have a textile tissue by using fibers, and has air distributed therein at random. As the diffusion reflection sheet 104, may be used a DuPont™ Optilon™ advanced composite reflector (ACR) made from DuPont Ltd.

The diffusion reflection sheet 104 includes a first diffusion reflection sheet 104a disposed on an end portion of an inner lower surface of the lamp housing 107, and a second diffusion reflection sheet 104b disposed on an end portion of an inner upper surface of the lamp housing 107.

The first diffusion reflection sheet 104a is disposed to overlap the end of the light guide plate 103, and some regions of the LC panel 101. An end portion of the first diffusion reflection sheet 104a adjacent to the lamp 102 overlaps with an end portion of a rear surface of the light guide plate 103 adjacent to the lamp 102. And, an end portion of the first diffusion reflection sheet 104a not adjacent to the lamp 102 is disposed to be within ±5 mm, based on a line perpendicular to an upper surface of the LC panel 101 which divides a display region (AA) and a non-display region (NA) of the LC panel 101 from each other. Preferably, the first diffusion reflection sheet 104a is disposed so that a side surface thereof can come in contact with a side surface of the reflection sheet 106 without a gap therebetween.

And, the second diffusion reflection sheet 104b is disposed to overlap an end portion of the light guide plate 103 and some regions of the LC panel 101. An end portion of the second diffusion reflection sheet 104b adjacent to the lamp 102 overlaps with an end portion of an upper surface of the light guide plate 103 adjacent to the lamp 102. And, an end portion of the second diffusion reflection sheet 104b not adjacent to the lamp 102 is disposed to overlap with an outermost region of an inner upper surface of the lamp housing 107.

FIG. 4 shows that the diffusion reflection sheet 104 is bonded to an inner surface of the lamp housing 107. However, the present invention is not limited to the embodiment shown in FIG. 4. For instance, the diffusion reflection sheet 104 may be bonded to the surface of the light guide plate 103.

A bonding material is entirely formed on one surface of the diffusion reflection sheet 104.

The diffusion reflection sheet 104 is bonded to an inner surface of the lamp housing 107 as the one surface thereof having a bonding material is bonded thereto.

Preferably, a thickness of the first diffusion reflection sheet 104a is same as that of the second diffusion reflection sheet 104b. And, preferably, the thickness of the diffusion reflection sheet 104 is same as that of the reflection sheet 106.

Preferably, the diffusion reflection sheet 104 is formed to have a reflectivity more than 90%. The diffusion reflection sheet 104 is preferably formed to have a half-intensity angle more than 80° based on light having an incident angle of 20°. Here, the half-intensity angle indicates an angle of light among light diffusion-reflected onto the diffusion reflection sheet 104, the light located on a point corresponding to a half of a maximum brightness.

Figure 5:
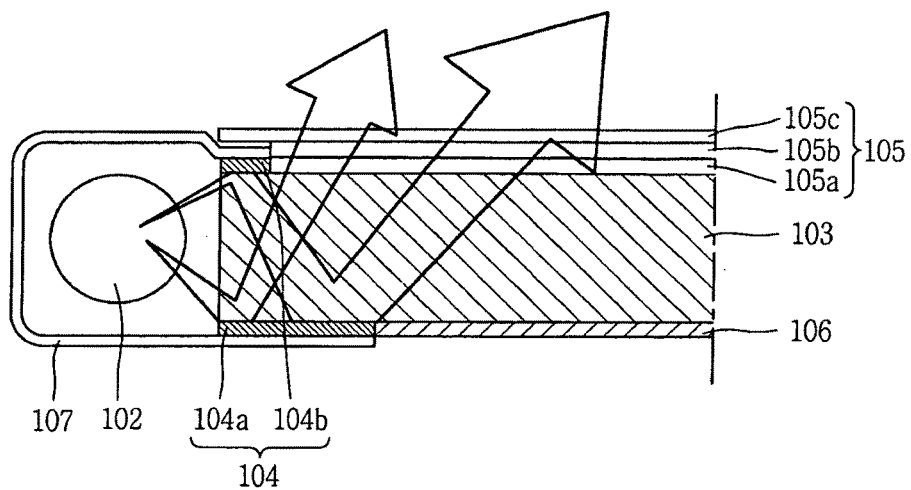
FIG. 5 is a sectional view showing a diffusion reflection sheet of the LCD device of FIG. 4.

As shown in FIG. 5, the diffusion reflection sheet 104 serves to diffusion-reflect light emitted from the lamp 102 thus to lower an optical distribution rate. Accordingly, a planar optical source having a uniform brightness may be supplied to the LC panel 101.

Referring to FIG. 4, the first diffusion reflection sheet 104a and the second diffusion reflection sheet 104b are provided in the lamp housing 107. However, the first embodiment is not limited to the above configuration shown in FIG. 4. For instance, only one of the first and second diffusion reflection sheets 104a and 104b may be provided in the lamp housing 107.

The light guide plate 103 is disposed at one side of the lamp 102 of which one end has been inserted into the opening of the lamp housing 107. The light guide plate 103 serves to guide light emitted from the lamp 102 to the LC panel 101.

The reflection sheet 106 for reflecting light leaked to a lower side of the light guide plate 103 to inside of the light guide plate 103 is disposed under the light guide plate 103. And, an optical sheet 105 for supplying light emitted from the light guide plate 103 to the LC panel 101 after a conversion process is disposed on the light guide plate 103.

The optical sheet 105 is composed of a plurality of sheets, more concretely, a first prism sheet 105a, a second prism sheet 105b and a diffusion sheet 105c. Here, the diffusion sheet 105c serves not only to diffuse light, but also to protect the second prism sheet 105b.

The LCD device according to the first embodiment of the present invention needs to prevent loss of light emitted from the lamp 102, and is required to be protected from an external impact. For this, provided are a panel guide 108 for mounting the LC panel 101 on a stepped surface formed therein; a lower cover 109 for covering an outer portion of the panel guide 108, and accommodating therein the lamp 102, the lamp housing 107, the light guide plate 103, the reflection sheet 106, etc.; and an upper cover 101 coupled to the lower cover 109, for covering the edge of the LC panel 101.

In the LCD device according to the first embodiment of the present invention, the diffusion reflection sheet 104 is disposed on at least one of end portions of inner upper and lower surfaces of the lamp housing 107, thereby supplying a planar optical source having a uniform brightness to the LC panel 101.

Accordingly, the LCD device has an enhanced display quality, and minimizes the number of the optical sheets disposed for a uniform brightness. And, required is no light shielding unit disposed on a region near an optical source so as to be printed on the optical sheet, or additionally provided for prevention of non-uniform brightness.

Second Embodiment

An LCD device according to a second embodiment of the present invention will be explained in more detail with reference to FIGS. 6 and 7.

Figure 6:
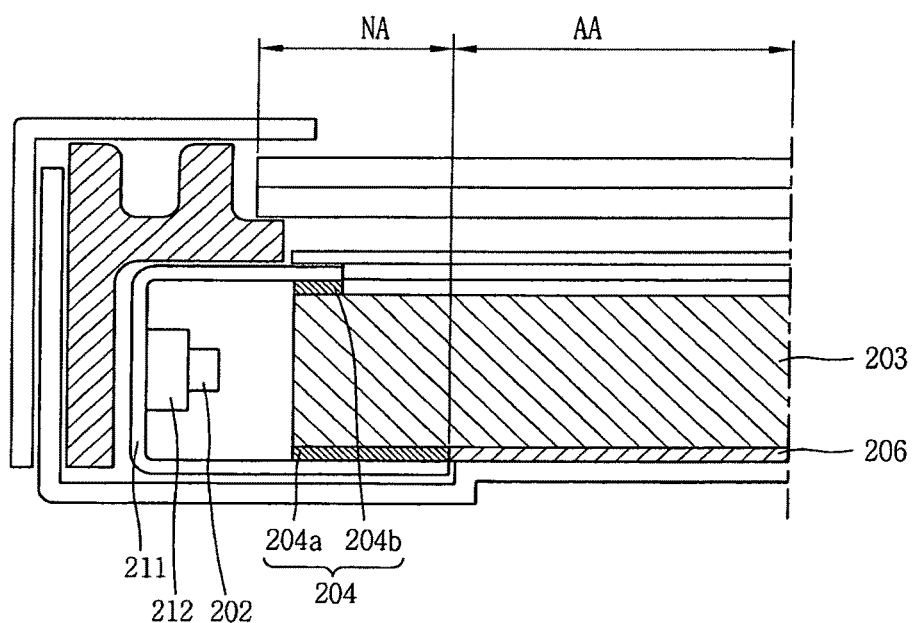
FIG. 6 is a sectional view showing an LCD device according to a second embodiment of the present invention.
Figure 7:
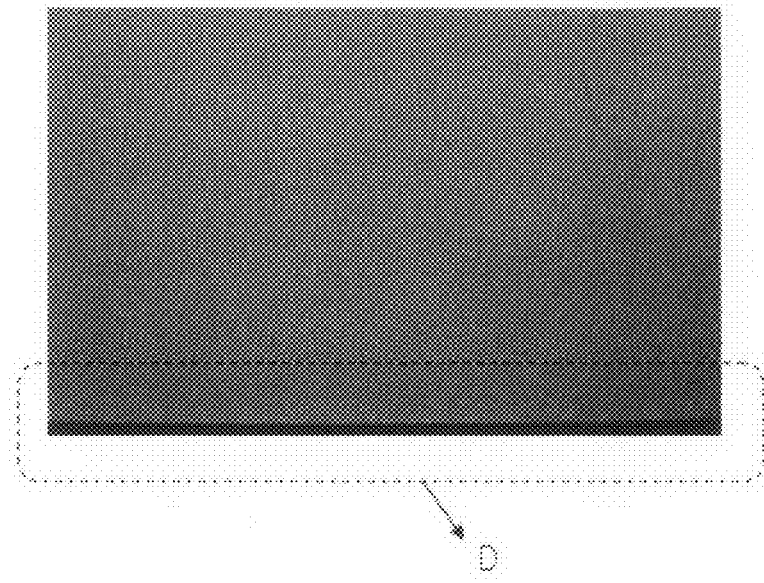
FIG. 7 is a photo showing a light emitting diode driven after sequentially arranging a reflection sheet, a light guide plate, and an optical sheet at one side of the light emitting diode, and arranging a diffusion reflection sheet on an outer surface of the light guide plate.
Figure 8:
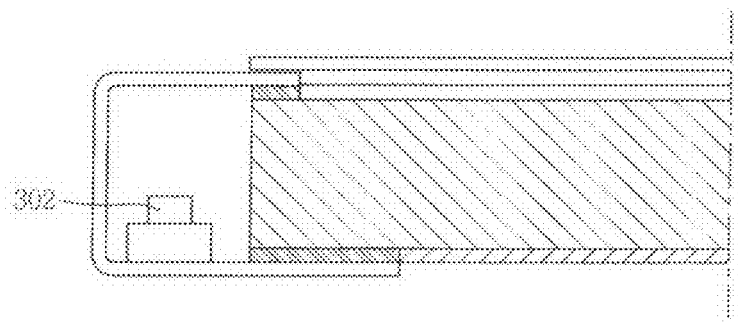
FIG. 8 is a sectional view showing another arrangement of point light sources in FIG. 6.

As shown in FIG. 6, the LCD device according to a second embodiment of the present invention comprises an LC panel; a plurality of point light sources 202 disposed below the LC panel, for supplying light to the LC panel; a light guide plate 203 disposed at one side of the point light sources 202, for guiding light emitted from the point light sources 202 to the LC panel; and first and second diffusion reflection sheets 204a and 204b disposed at end portions of lower and upper surfaces of the light guide plate 203, respectively, so as to be adjacent to the point light sources 202, and having air distributed therein at random.

Although not shown, the LC panel (not shown) is composed of a color filter substrate that is an upper substrate, and a thin film transistor (TFT) array substrate that is a lower substrate. An LC layer is formed between the two substrates. Although not shown, the LC panel has a display region for displaying an image, and a non-display region disposed at the periphery of the display region.

A plurality of the point light sources 202 mounted on a printed circuit board 212 are disposed below the LC panel, and the LC panel displays an image by receiving light from the point light sources 202.

In FIG. 4, the point light source 202 is arranged by a top view method. However, the second embodiment is not limited to this. For instance, a point light source 302 may be arranged by a side view method as shown in FIG. 5. Here, the top view method indicates a method for emitting light from the point light source 202 in a direction perpendicular to a front surface of a printed circuit board 212. On the contrary, the side view method indicates a method for emitting light from the point light source 202 in a direction parallel to the front surface of the printed circuit board 212.

In the LCD device according to the second embodiment, the point light source 202 was implemented as a light emitting diode (LED). Accordingly, the point light source 202 to be hereinafter mentioned indicates an LED. However, the point light source 202 is not limited to the LED, but may be implemented as another types of one.

The point light source 202 is mounted on a flexible printed circuit board (FPCB) 211. And, the FPCB 211 has both end portions twice-bent so as to be adjacent to end portions of upper and lower surfaces of the light guide plate 203. Especially, the point light source 202 is mounted on the FPCB 211 adjacent to a side surface of the light guide plate 203.

Referring to FIG. 6, a diffusion reflection sheet 204 is disposed on end portions of upper and lower surfaces of the light guide plate 203 so as to be adjacent to the point light source 202. The diffusion reflection sheet 204 has air distributed therein at random.

The diffusion reflection sheet 204 is different from a general reflection sheet having an air layer inserted thereto through an elongation process. And, the diffusion reflection sheet 204 is formed to have a textile tissue by using fibers, and has air distributed therein at random. As the diffusion reflection sheet 204, may be used a DuPont™ Optilon™ advanced composite reflector (ACR) made from Du Pont Ltd.

The diffusion reflection sheet 204 includes a first diffusion reflection sheet 204a disposed on an end portion of a lower surface of the light guide plate 203, and a second diffusion reflection sheet 204b disposed on an end portion of an upper surface of the light guide plate 203.

The first diffusion reflection sheet 204a is disposed to overlap the end of the light guide plate 203, and some regions of the LC panel 201. An end portion of the first diffusion reflection sheet 204a adjacent to the point light source 202 overlaps with an end portion of a rear surface of the light guide plate 203 adjacent to the point light source 202. And, an end portion of the first diffusion reflection sheet 204a not adjacent to the point light source 202 is disposed to be within ±5 mm, based on a line perpendicular to an upper surface of the LC panel 201 which divides a display region (AA) and a non-display region (NA) of the LC panel 201 from each other. Preferably, the first diffusion reflection sheet 204a is disposed so that a side surface thereof can come in contact with a side surface of the reflection sheet 206 without a gap therebetween.

And, the second diffusion reflection sheet 204b is disposed to overlap an end portion of the light guide plate 203 and some regions of the LC panel 201. An end portion of the second diffusion reflection sheet 204b adjacent to the point light source 202 overlaps with an end portion of an upper surface of the light guide plate 203 adjacent to the point light source 202. And, an end portion of the second diffusion reflection sheet 204b not adjacent to the point light source 202 is disposed to overlap with an outermost region of an inner upper surface of the FPCB 211.

A bonding material is entirely formed on one surface of the first diffusion reflection sheet 204a. The first diffusion reflection sheet 204a is bonded to a rear surface of the light guide plate 203 as the one surface thereof having a bonding material is bonded thereto.

A bonding material is entirely formed on one surface of the second diffusion reflection sheet 204b. The second diffusion reflection sheet 204b is bonded to an upper surface of the light guide plate 203 as the one surface thereof having a bonding material is bonded thereto.

Preferably, a thickness of the first diffusion reflection sheet 204a is same as that of the second diffusion reflection sheet 204b. And, preferably, the thickness of the diffusion reflection sheet 204 is same as that of the reflection sheet 206.

Preferably, the diffusion reflection sheet 204 is formed to have a reflectivity more than 90%. The diffusion reflection sheet 204 is preferably formed to have a half-intensity angle more than 80° based on light having an incident angle of 20°. Here, the half-intensity angle indicates an angle of light among light diffusion-reflected onto the diffusion reflection sheet 204, the light located on a point corresponding to a half of a maximum brightness.

As shown in FIG. 6, the diffusion reflection sheet 204 serves to diffusion-reflect light emitted from the lamp 202 thus to lower an optical distribution rate. Accordingly, light having a uniform brightness may be supplied to the LC panel (not shown).

Referring to FIG. 6, the first diffusion reflection sheet 204a and the second diffusion reflection sheet 204b are provided on lower and upper surfaces of the light guide plate 204, respectively. However, the first embodiment is not limited to the above configuration shown in FIG. 6. For instance, only one of the first and second diffusion reflection sheets 204a and 204b may be provided in the light guide plate 204.

The reflection sheet 206 for reflecting light leaked to a lower side of the light guide plate 203 to inside of the light guide plate 203 is disposed under the light guide plate 203. And, an optical sheet 205 for supplying light emitted from the light guide plate 203 to the LC panel (not shown) after a conversion process is disposed on the light guide plate 203.

The optical sheet 205 is composed of a plurality of sheets, more concretely, a first prism sheet 205a, a second prism sheet 205b and a diffusion sheet 205c. Here, the diffusion sheet 205c serves not only to diffuse light, but also to protect the second prism sheet 205b.

In the LCD device according to the second embodiment of the present invention, the diffusion reflection sheet 204 is disposed on at least one of end portions of upper and lower surfaces of the light guide plate 203. Accordingly, a planar optical source having a uniform brightness may be supplied to the LC panel as shown in the region of 'D' of FIG. 7.

Accordingly, the LCD device has an enhanced display quality, and minimizes the number of the optical sheets disposed for a uniform brightness. And, required is no light shielding unit disposed on a region near an optical source so as to be printed on the optical sheet, or additionally provided for prevention of non-uniform brightness.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
an LC panel;
a lamp for supplying light to the LC panel;
a lamp housing having an opening for encompassing and protecting the lamp;
a first and a second diffusion reflection sheets for diffusing and reflecting light incident from the lamp, the first and the second diffusion reflection sheets on end portions of an inner lower and an inner upper surfaces of the lamp housing, respectively; and
a light guide plate adjacent to the opening of the lamp housing for guiding light supplied from the lamp to the LC panel,
wherein one surface of the first and the second diffusion reflection sheets is respectively contacted with an upper surface and a lower surface of the light guide plate and another surface of the first and the second diffusion reflection sheets is respectively contacted with the inner lower surface and the inner upper surface of the lamp housing, an end portion of the first and the second diffusion reflection sheets not adjacent to the lamp overlaps with an outermost region of an inner upper surface of the lamp housing,
wherein the first and the second diffusion reflection sheets overlap an end portion of the light guide plate, and portions of the LC panel, and
wherein the lower surface of the lamp housing overlaps the light guide plate more than the upper surface of lamp housing overlaps the light guide plate,
wherein the LC panel includes a display region for displaying an image, and a non-display region at a periphery of the display region,
wherein an end portion of the first diffusion reflection sheet adjacent to the lamp overlaps with an end portion of a rear surface of the light guide plate adjacent to the lamp,
wherein an end portion of the first diffusion reflection sheet not adjacent to the lamp is within ±5 mm, based on a line perpendicular to an upper surface of the LC panel which divides the display region and the non-display region of the LC panel from each other, and
wherein an end portion of the second diffusion reflection sheet not adjacent to the lamp is about on a line perpendicular to the upper surface of the LC panel which divides the display region and the non-display region of the LC panel from each other.

2. The LCD device of claim 1, wherein the first and the second diffusion reflection sheets have a reflectivity more than 90%.

3. The LCD device of claim 1, wherein the first and the second diffusion reflection sheets have a half-intensity angle more than 80° based on light having an incident angle of 20°.

4. The LCD device of claim 1, wherein at least one of the first and the second diffusion reflection sheets is bonded to an inner surface of the lamp housing.

5. The LCD device of claim 4, wherein the at least one of the first and the second diffusion reflection sheets is bonded to an inner surface of the lamp housing as one surface of the diffusion reflection sheet having a bonding material thereon is bonded to the inner surface of the lamp housing.

6. The LCD device of claim 1, wherein at least one of the first and the second diffusion reflection sheets is bonded to a surface of the light guide plate.

7. The LCD device of claim 1, further comprising a reflection sheet under the light guide plate to reflect light to the LC panel, wherein a side surface of the first diffusion reflection sheet comes in contact with a side surface of the reflection sheet without a gap therebetween.

8. The LCD device of claim 1, wherein a first prism sheet, a second prism sheet, and a diffusion sheet are on the light guide plate, sequentially.

9. A liquid crystal display (LCD) device, comprising:
an LC panel;
a plurality of point light sources for supplying light to the LC panel;
a light guide plate at a side of the plurality of point light sources, for guiding light emitted from the point light sources to the LC panel;
a first and a second diffusion reflection sheets on end portions of a lower and an upper surfaces of the light guide plate and adjacent to the point light sources, respectively; and
a flexible printed circuit board (FPCB) having both end portions twice-bent so as to be adjacent to end portions of the upper and the lower surfaces of the light guide plate, the FPCB on which the point light sources are mounted,
wherein an end portion of the first and the second diffusion sheets not adjacent to the point light source overlaps an outermost region of an inner upper surface of the FPCB,
wherein the LC panel includes a display region for displaying an image, and a non-display region at a periphery of the display region,
wherein an end portion of the first diffusion reflection sheet adjacent to the point light sources overlaps with an end portion of a rear surface of the light guide plate adjacent to the point light sources,
wherein an end portion of the first diffusion reflection sheet not adjacent to the point light sources is within ±5 mm, based on a line perpendicular to an upper surface of the LC panel which divides the display region and the non-display region of the LC panel from each other, and
wherein an end portion of the second diffusion reflection sheet not adjacent to the point light sources is on a line perpendicular to the upper surface of the LC panel which divides the display region and the non-display region of the LC panel from each other.

10. The LCD device of claim 9, wherein the first and the second diffusion reflection sheets have a reflectivity more than 90%.

11. The LCD device of claim 9, wherein the first and the second diffusion reflection sheets have a half-intensity angle more than 80° based on light having an incident angle of 20°.

12. The LCD device of claim 9, wherein at least one of the first and the second diffusion reflection sheets is bonded to a surface of the light guide plate.

13. The LCD device of claim 12, wherein at least one of the first and the second diffusion reflection sheets is bonded to an inner surface of the lamp housing as one surface of the diffusion reflection sheet having a bonding material thereon is bonded to the inner surface of the lamp housing.

14. The LCD device of claim 9, wherein the point light sources are arranged by a top view method.

15. The LCD device of claim 9, wherein the point light sources are arranged by a side view method.

16. The LCD device of claim 9, further comprising a reflection sheet under the light guide plate to reflect light to the LC panel,
wherein a side surface of the first diffusion reflection sheet comes in contact with a side surface of the reflection sheet without a gap therebetween.

* * * * *